3,697,439
COMPOSITION FOR CONTROLLING FOAMING IN AQUEOUS SYSTEMS AND ITS METHOD OF USE
Hillel Lieberman, Andalusia, Carlos A. Duharte-Francia, Fort Washington, and John W. Henderson, Philadelphia, Pa., assignors to Betz Laboratories, Inc., Trevose, Pa.
No Drawing. Filed May 26, 1969, Ser. No. 827,943
Int. Cl. B01d
U.S. Cl. 252—321                                   14 Claims

ABSTRACT OF THE DISCLOSURE

This disclosure relates to defoaming compositions and their use in controlling foam in aqueous systems. The compositions which can be emulsive in character consist essentially of a combination of aluminum oxide particles, at least one alkali metal or alkaline earth metal hydroxide, at least one fatty acid containing from 6 to 24 and preferably 16 to 22 carbon atoms, and a water-insoluble liquid organic carrier. The composition may contain water, and where the liquid carrier is hydrophobic in character, the composition will be an emulsion. Moreover, in certain instances it is desirable to incorporate surface-active agents (surfactants) or spreading agents in the composition.

BACKGROUND OF THE INVENTION

Foam of course, is a most undesirable by-product in most industries since it does have a direct and drastic effect upon production efficiency and accordingly the economics of a system or process. In some systems, foam can be tolerated to a certain extent; however in most systems such as the pulp and paper producing processes, the quality of the product is dependent upon the control of foam.

To date, many different defoamers have been used successfully in kraft pulp mill applications. Of those which bear mentioning are the hydrophobic silica containing defoamers. However, because of the particularities which are found between the different pulping or paper making processes, the industry is constantly looking for a defoamer that will be effective, if not in all applications, in at least a great percentage of the cases.

The differences in temperature, wood used, resin content, agitation rates, production speed, solids' content, charge formulas etc. all make the objective of supplying one economic defoamer composition for all applications rather illusive.

Accordingly, it was the present inventors' objective to not only formulate a defoamer which might meet the above-described goal, but one which would also attain this goal while at the same time meeting certain price and economic prerequisites. A more comprehensive description of the problems that must be overcome and where they are found are discussed in co-pending U.S. application Ser. No. 809,931 filed Mar. 24, 1969.

At this point it seems to be appropriate to point out that the industry, and in particular the paper and pulp industry, expects a supplier of defoaming compositions to provide compositions which are liquid, pourable and uniformly dispersible throughout the system. Although many defoamers have been successful in combatting foam, these compositions have been paste-like in consistency. The industry rather than use a paste-like product will use a less effective liquid defoamer composition because less time and labor are involved in the feeding of the liquid and a better dispersion of the liquid is attained. With liquids, automatic feeding devices may be used to feed known and uniform quantities and these devices require little surveillance. Paste products on the other hand, generally require manual measurement and feeding which in turn adds labor costs to the operation.

Therefore the present inventors, in addition to the aforementioned prerequisites, had to formulate a material which was not only effective under the diverse conditions found in the various operations, but also one which was liquid at room temperature.

GENERAL DESCRIPTION OF THE INVENTION

As stated in the abstract above, the present invention is directed to defoamer compositions and their use in curbing or controlling foam in aqueous systems. The present inventors discovered that if a small but effective amount of a composition comprising colloidal aluminum oxide, a metal hydroxide, a fatty acid and a water-insoluble organic liquid with or without water was added to an aqueous system, which ordinarily would yield a large quantity of foam that the system could be controlled to such an extent that the foam problems normally encountered were no longer extant.

The character of the composition is different depending of course, upon whether water is incorporated or not, and upon the type water-insoluble organic liquid employed. In any case, the composition obtained is pourable at room and application temperatures. The composition is effective whether water is present in the composition or not. However, although the presence of water in the composition does not affect the pourability of the product, it does create a more stable product in that oil-insoluble granules will be dissolved. In some instances, it is desirable to incorporate, depending upon the variations encountered, a surfactant or spreading agent.

The effective treatment levels for the inventive composition were determined to be within the range of from about 0.01 to about 1% by weight of the defoamer based upon the weight of the dry solids content of the aqueous system. Although, as explained above, many factors can cause or contribute to the production and existence of foam in an aqueous system, the prime factor is considered to be the "solids content" of the aqueous system. Accordingly, this factor has been used in the industry to approximate treatment levels. Although treatment levels above 1% are successful in controlling foam, the use of excesses above this level are prohibitive due to cost considerations.

The composition of the invention contains as its major constituents, on a weight basis, from about 0.5 to about 20% and preferably from about 2 to about 15% aluminum oxide particles, from about 0.1 to about 10%, and preferably from about 2 to 6% metal hydroxide, from about 0.1 to 10% and preferably from about 2 to 6% fatty acid, and from about 60 to about 98% and preferably from about 84 to about 94% water-insoluble organic liquid. When water is included in the composition it is included in an amount of from about 0.1 to about 10%, and preferably from about 2 to about 6%. The spreading agent or surfactant, if included can be present in amounts from about 0.5 to about 10%, and preferably from about 1% to about 5%. The content of the spreading agent or surfactant will vary depending upon the specific requirement of the particular application.

The aluminum oxide particles which are used in accordance with the present invention are any of the colloidal aluminum oxides which are of fine particle size. By fine particle size is meant that the average particle diameter is less than 15 microns and preferably in the range of from about 0.01 to about 1.3 microns. Aluminum oxide particles of this nature are prepared by various methods. One of the most widely used is the hydrolysis of aluminum chloride in a flame. Oxides obtained by this method possess extremely small particle diameter, high surface area and high purity. However, it should be noted that aluminum oxide particles obtained by other methods which yield substantially the same properties are also useful in accordance with the present invention. Aqueous suspensions (10%) of the aluminum oxides which are used yield pH's which range anywhere from 2.1 to 5.4.

The metal hydroxides of the invention can be any metal hydroxide, however the most effective compositions are those which contain an alkali metal hydroxide (sodium, potassium or ammonium) and/or an alkaline earth metal hydroxide, such as magnesium, calcium or barium, or a mixture of hydroxides.

The fatty acids which have given the most effective formulations are those which contain from about 16 to about 22 carbon atoms, such as palmitic, margaric, stearic, abietic, arachidic, eicosanoic, oleic, linolenic, linoleic etc. acids. However, the $C_6$–$C_{15}$ and the $C_{23}$ and $C_{24}$ acids such as capric, heptoic, caprylic, monylic, caproic, undecylic, lauric, tridecylic, myristic and pentadecylic have also been found to yield effective compositions. Moreover compositions containing mixtures of these acids were also found to be satisfactory.

The water-insoluble organic liquids which can be included in the composition are the vegetable oils, such as the water-insoluble edible oils which are extracted from seeds and which are generally considered to be mixtures of glycerides, the aliphatic hydrocarbons, the alicyclic hydrocarbons and the aromatic hydrocarbons and the halogenated derivatives thereof. These generic descriptions include many type carriers or liquids such as benzene, hexane, octane, mineral hydrocarbons such as the mineral oils (paraffinic oils, naphthenic oils, halogenated products thereof and kerosene), mineral seal oil and similar petroleum fractions, snythetic polymers and halogenated products thereof such as the liquid trifluorovinyl chloride polymers, long chain alcohols such as nonyl alcohol and octyl alcohol, long chain esters such as diglycol laurate, and long chain amines such as octyl amine, nonyl amine and 2-ethyl-1-amino-heptane. In many instances these liquid carriers are not only water-insoluble but also hydrophobic.

The carrier liquid should be of such nature that its boiling point should be greater that 150° F. and its viscosity should be such as to be liquid at room temperature. In the case of mineral hydrocarbons a viscosity of about 30 to 400 SUS (100° F.) has been found to be completely acceptable. From the vast number of water-insoluble liquids evaluated it would appear that any liquid which possesses the aforementioned properties would be operable.

Spreading agents or surfactants which are commercially available such as decyl alcohol, silicone oils (Union Carbide's L-45) and the polyester triols of high molecular weight (Union Carbide's LHT-42) have been used successfully in the inventive compositions. These agents are generally included where rapid distribution of the defoamer in a particular system is required.

The compositions of the invention can be made simply and easily by preparing a mixture of aluminum oxide particles, metal hydroxide, fatty acid and water-insoluble organic liquid (with or without water) and heating the mixture at a temperature and for a time sufficient to obtain a smooth flowing evenly mixed product.

The use of temperatures ranging from about 160 to about 220° F. and preferably from 180-200° F. and times of from about 15 to about 90 minutes and preferably from 35 to 55 minutes have resulted in products possessing the prerequisite features.

In order to determine the defoaming or antifoaming capacities of the compositions of the invention, a test procedure was devised which would not only establish the defoaming-antifoaming characteristics of the composition but also the "substantivity" of the compositions.

The testing procedure generally entails the following steps:

400 milliliters (ml.) of concentrated black liquor having a temperature of 180° F. (which temperature is generally used in mill operations), a dissolved solids content of approximately 7½% (28 grams) and a pH of about 12 are mixed with approximately 12 grams of a fiber or a mixture of fibers to produce a slurry of approximately ½% consistency. The mixture is then heated to maintain the 180° F. temperature.

To the slurry is then added a portion of the defoamer to be tested. The resulting slurry is mixed well, filtered and washed with water and black liquor. The filtrate in each case is discarded. Approximately fifteen (15) grams of the damp fiber obtained is slurried in 600 ml. of a dilute solution of the black liquor (9 parts water for each 1 part of concentrated black liquor). The resulting slurry is then circulated from the calibrated reservoir holding the slurry to and through a pump and back to the reservoir. This action agitates the slurry and simulates the conditions which are normally encountered in the washing and screening stages of the pulp during its production and purification. The reservoir is calibrated in centimeters in order to measure the foam height at various time intervals which is a mode of measuring the degree of foaming of a system or in other terms, the defoaming or antifoaming action of the composition. The height of the foam is noted at various intervals and the longer the time required for the foam to reach a certain level the better the inhibiting properties of the composition.

The calibrations of the reservoir range from 0 to 300 centimeters with the normal slurry volume taking up the first 100 cm. A reading therefore of "100" means that essentially no foam formed during the respective period. The last reading is made when the foam overflows the reservoir or exceeds the 300 centimeter level.

The test is an excellent measure of the defoaming characteristics of a composition since it is quite stringent. It will be noted that the initial slurry to which the defoamer was added is filtered and the filtrate is discarded and that the fibers were then washed. Accordingly, the defoaming action of the composition is entirely due to the residual amount of composition which remains with the fiber. The test consequently, not only measures the defoaming or antifoaming capacity of a composition under the most adverse conditions but also its "substantivity" i.e. its capacity to remain with the fiber and to perform its function when present in only minor quantities.

Having thus described the invention generally, specific embodiments thereof are set forth below. However, these embodiments are included as representative only and are not intended to be limitative of the invention.

EXAMPLE 1

A mixture containing the following ingredients, in the respective percent by weight based upon the total weight of the composition was prepared and mixed thoroughly.

8% by weight of Alon C (Cabot Corp.—Alon C is a colloidal aluminum oxide, $Al_2O_3$, prepared by the hydrolysis of aluminum chloride in a flame. The particles of aluminum oxide possess a surface area of approximately 100 square meters/gram and possess a pH of about 4.4 when made into a 10% aqueous suspension.

90% paraffinic hydrocarbon oil (Atlantic Corp.—Alpha Oil C which possesses a specific gravity of 0.86 at 60° F. and an SUS viscosity of 150 at 100° F.

0.9% fatty acids (Industrene 3022—mixture of $C_{16}$, $C_{18}$, $C_{20}$ and $C_{22}$ fatty acids)

0.2% calcium hydroxide 0.9% water

The mixture was heated at a temperature of 180° F. for a period of 45 minutes. The product obtained was a milk colored, evenly mixed liquid which flowed smoothly at room temperature.

EXAMPLE 2

A product was prepared in the manner described in Example 1 with the exception that the mixture contained

|  | Percent |
|---|---|
| Aluminum oxide (Alon C) | 3 |
| Alpha-Oil C (paraffinic mineral oil) | 87 |
| Industrene 3022 (mixture of fatty acids) | 4.5 |
| Calcium hydroxide | 1 |
| Water | 4.5 |

The product obtained was a smooth flowing water-in-oil emulsion which was completely fluid at room temperature.

EXAMPLE 3

The same procedure as described in Example 1 was followed with the exception that the mixture was composed of

|  | Percent |
|---|---|
| Aluminum oxide particles (Alon C) | 1 |
| Paraffinic mineral oil (Alpha-Oil C) | 89 |
| Mixture of fatty acids (Industrene 3022) | 4.5 |
| Calcium hydroxide | 1.0 |
| Water | 4.5 |

The product was a smooth-flowing water-in-oil emulsion.

EXAMPLE 4

In this case the mixture which was heated for about 45 minutes at 180° F. contained

|  | Percent |
|---|---|
| Aluminum oxide particles (Alon C) | 8 |
| Naphthenic mineral oil (Gulf Oil—560) | 90 |
| Mixture of fatty acids (Industrene 3022) | 0.9 |
| Calcium hydroxide | 0.2 |
| Water | 0.9 |

The product obtained was somewhat emulsive in nature, was evenly mixed and fluid at room temperature.

EXAMPLE 5

The product of this example was produced to illustrate the necessity of the inclusion of all of the ingredients. The mixture contained

|  | Percent |
|---|---|
| Aluminum oxide particles (Alon C) | 6 |
| Paraffinic mineral oil (Alpha-Oil C) | 94 |

The mixture was heated at the temperature and for the time designated in Example 1.

The product obtained was somewhat more viscous than those obtained according to the preceding examples. However, the product was still pourable at room temperature.

Defoaming capacity of the composition of Examples 1 through 5

The compositions of Examples 1-5 were tested according to the procedure outlined above. In the tests the fibers were those obtained from the source indicated under the appropriate heading of the table illustrating the results obtained. In each of the tests, the present compositions were comparatively tested with respect to various commercially available products. These products are composed essentially of hydrophobic silica dispersed in various water-insoluble hydrocarbons, such as mineral oils. The products differ in silica content and in some cases the products contain surface active agents.

Since the activity of these commercial products relates to the hydrophobic silica content, the products are described in this manner.

Product A contains 10% by weight hydrophobic silica.
Product B contains 20% by weight hydrophobic silica.
Product C contains 15% by weight hydrophobic silica.
Product D contains 12% by weight hydrophobic silica.
Product E contains 12% by weight hydrophobic silica (different supplier from Product D).
Product F contains 10% by weight hydrophobic silica (different supplier from Product A).
Product G contains 15% by weight hydrophobic silica (different supplier from Product C).
Product H contains 9% by weight hydrophobic silica.
Product J contains 11% by weight hydrophobic silica.
Product K contains 20% by weight hydrophobic silica (different supplier from Product B).

The concentration of the defoamer was approximately 0.01 gram which represented about 0.02% by weight of the dissolved solids of the black liquor.

TABLE 1

| Composition of— | Source of fiber stock | Percent by weight aluminum oxide | Percent by weight hydrophobic silica | Foam height after designated intervals (cm.) | | | | | | Time of overflow i.e. time required for foam to exceed 300 cm. (sec.) |
|---|---|---|---|---|---|---|---|---|---|---|
| | | | | 10 sec. | 20 sec. | 30 sec. | 60 sec. | 120 sec. | 180 sec. | |
| Example 1 | Pa. paper and pulp mill (Sample). | 8 | | 130 | 140 | 150 | 190 | 240 | 280 | 183 |
| Example 2 | do | 3 | | 155 | 170 | 175 | 200 | 270 | | 134 |
| Product A | do | | 10 | 180 | 200 | 220 | 240 | 275 | | 125 |
| Example 1 | Same mill as above sample stock taken at a later date (Sample 2). | 8 | | 180 | 190 | 200 | 225 | 240 | 270 | >300 |
| Example 2 | do | 3 | | 220 | 230 | 235 | 260 | 290 | | 128 |
| Example 3 | do | 1 | | 250 | 270 | 285 | | | | 56 |
| Product A | do | | 10 | 220 | 240 | 255 | 265 | | | 114 |
| Example 1 | Same mill as above sample stock taken at a later date (Sample 3). | 8 | | 150 | 180 | 205 | 215 | 220 | 235 | 260 |
| Example 2 | do | 3 | | 260 | 250 | 240 | 260 | 275 | | 150 |
| Product A | do | | 10 | 240 | 270 | 275 | | | | 36 |
| Product E | do | | 12 | 180 | 245 | 265 | 265 | | | 90 |
| Product G | do | | 15 | 300 | | | | | | 11 |
| Example 1 | Paper and pulp mill located in Mississippi (Sample 1). | 8 | | 170 | 210 | 240 | 295 | | | 62 |
| Example 2 | do | 3 | | 210 | 210 | 220 | 265 | | | 78 |
| Example 3 | do | 1 | | 250 | 280 | 300 | | | | 30 |
| Example 4 | do | 8 | | 160 | 210 | 240 | | | | 48 |
| Example 5 | do | 6 | | | | | | | | 9 |
| Product A | do | | 10 | 190 | 235 | 265 | | | | 48 |
| Product B | do | | 20 | 295 | | | | | | 11 |
| Example 1 | Same mill as above sample stock taken at a later date (Sample 2). | 8 | | 115 | 130 | 135 | 170 | 230 | 280 | >300 |
| Example 2 | do | 3 | | 150 | 140 | 140 | 160 | 180 | 195 | >300 |
| Product A | do | | 10 | 140 | 180 | 225 | 290 | | | 70 |

TABLE 1—Continued

| Composition of— | Source of fiber stock | Percent by weight aluminum oxide | Percent by weight hydrophobic silica | Foam height after designated intervals (cm.) | | | | | | Time of overflow i.e. time required for foam to exceed 300 cm. (sec.) |
|---|---|---|---|---|---|---|---|---|---|---|
| | | | | 10 sec. | 20 sec. | 30 sec. | 60 sec. | 120 sec. | 180 sec. | |
| Example 1 | Same mill as above sample stock taken at a later date (Sample 3). | 8 | | 125 | 135 | 140 | 160 | 190 | 225 | >300 |
| Example 2 | do | 3 | | 150 | 140 | 140 | 140 | 160 | 180 | >300 |
| Product A | do | | 10 | 175 | 195 | 230 | 250 | | | 107 |
| Example 1 | Paper and pulp mill located in Mississippi (different mill from the above). | 8 | | 100 | 100 | 110 | 120 | 125 | 100 | >300 |
| Example 2 | Paper and pulp mill located in Mississippi (different mill from the above). | 3 | | 110 | 110 | 115 | 125 | 140 | 185 | >300 |
| Product E | do | | 12 | 100 | 110 | 125 | 160 | 180 | 195 | >300 |
| Product K | do | | 20 | 110 | 135 | 165 | 175 | 175 | 200 | >300 |
| Example 1 | Paper and pulp mill located in Oregon (Sample 1). | 8 | | 120 | 135 | 145 | 160 | 210 | 220 | >800 |
| Example 2 | do | 3 | | 140 | 145 | 150 | 150 | 155 | 155 | 628 |
| Product A | do | | 10 | 140 | 175 | 220 | 250 | | | 120 |
| Product C | do | | 15 | 220 | 255 | 285 | | | | 40 |
| Product D | do | | 12 | 275 | | | | | | 20 |
| Example 1 | Same mill as above sample stock taken at a later date. | 8 | | 130 | 115 | 120 | 160 | 250 | | 145 |
| Example 2 | do | 3 | | 130 | 130 | 130 | 135 | 155 | 175 | >300 |
| Product E | do | | 12 | 130 | 140 | 155 | 240 | | | 88 |
| Product K | do | | 20 | 125 | 140 | 160 | 210 | | | 95 |
| Example 1 | Paper and pulp mill located in N. Carolina. | 8 | | 110 | 150 | 190 | 230 | 250 | | 177 |
| Example 2 | do | 3 | | 165 | 190 | 195 | 205 | 195 | 205 | >300 |
| Product A | do | | 10 | 250 | 260 | | | | | 22 |
| Product E | do | | 12 | 170 | 200 | 270 | | | | 31 |
| Product J | do | | 11 | | | | | | | 8 |
| Example 1 | Paper and pulp mill located in W. Virginia. | 8 | | 120 | 125 | 120 | 125 | 180 | 230 | 250 |
| Example 2 | do | 3 | | 130 | 140 | 140 | 140 | 160 | 175 | >300 |
| Product A | do | | 10 | 140 | 195 | 240 | | | | 47 |
| Product E | do | | 12 | 140 | 160 | 190 | 255 | | | 73 |
| Product K | do | | 20 | 140 | 160 | 205 | 260 | | | 60 |
| Example 2 | Paper and pulp mill located in Maine. | 3 | | 100 | 105 | 105 | 110 | 120 | 130 | >300 |
| Product F | do | | 10 | 115 | 125 | 200 | 250 | | | 73 |
| Example 2 | Paper and pulp mill located in Georgia. | 3 | | 170 | 210 | 220 | 230 | 255 | 270 | 255 |
| Product H | do | | 9 | 210 | | | | | | 18 |

Conclusions

In all of the above trials, the compositions of the present invention proved to be superior to the commercially available hydrophobic silica defoamers. In those cases where the test trials were quite close, the present compositions offered more advantages since they contained less active constituent in comparison with the hydrophobic-silica containing commercially available products. This fact in itself contributes the advantages of lower raw material costs and faster and more economic production. Moreover as can be appreciated, when working with particles having the sizes described, it is difficult to handle these materials and to add them efficiently to the mixtures of ingredients to produce the compositions. Therefore the need for lower quantities of active ingredient not only greatly aids in the preparation of the compositions, but also leads to products of lower unit cost, which products are as effective and in many cases more effective than the commercially available products.

EXAMPLES 6–11

The defoaming compositions of Examples 6 through 11 were produced according to the process outlined in Example 1. The constituents of the compositions and their respective concentrations in the compositions were as follows:

| Composition of— | Aluminum oxide (Alon C) | Fatty acid mixture contains 60% stearic acid, 40% $C_{14}$ $C_{16}$ acids | $H_2O$ | Calcium hydroxide | Paraffinic mineral oil (Alpha-oil C) |
|---|---|---|---|---|---|
| Example 6 | 5 | 2 | 2 | 0.5 | 90.5 |
| Example 7 | 5 | 2 | 3 | 0.8 | 89.2 |
| Example 8 | 7 | 2 | 3 | 0.4 | 87.6 |
| Example 9 | 7 | 2 | 3 | 0.8 | 87.2 |
| Example 10 | 7 | 2 | 3 | 1.5 | 86.5 |
| Example 11 | 7 | 4 | 3 | 1.5 | 84.5 |

The compositions of Examples 6 through 11 gave upon testing according to the procedure described above, topping times i.e. over 300 cm., respectively of: greater than 300 sec., 125 sec., greater than 300 sec., 223 sec., 180 sec. and greater than 300 sec. Product L which contained approximately 10% by weight of hydrophobic silica yielded a topping time of 180 sec. under the same testing conditions.

As is apparent, the compositions of Examples 6 through 11 all contained less active constituent (aluminum oxide) than the commercial product containing hydrophobic silica and performed either as well as or better than the commercial product. However, the main purpose of the test was to illustrate the overall effectiveness of the same mixture with the concentrations of the ingredients varied.

The foregoing examples demonstrate the type compositions which were tested comprehensively. To test the overall concept, various compositions were made which contained the higher and lower concentration ranges disclosed for the respective ingredients of the composition and to establish the results obtainable by the substitution of (i) magnesium, barium, sodium, potassium and/or ammonium hydroxide for the calcium hydroxide,
(ii) the various water-insoluble organic liquids disclosed for the oil used in the specific examples, and (iii) the various fatty acids and mixtures thereof for the fatty acids of the specific examples.

Moreover, the temperature and time of heating ranges as disclosed for the preparation of the compositions were tested to clearly establish the best ranges. In all instances the compositions produced exhibited effective defoaming capacity. Some compositions although operating quite superiorly on various stock samples, operated just satisfactorily on others. However, the concept was borne out by the testing and the worker in the art upon being appraised of the concept, will have no difficulty in ascertaining which composition would suit his purpose, performance-wise and cost-wise.

EXAMPLES 12 THROUGH 14

The compositions of Examples 1 through 3 were reproduced with the exception that no water was used to formulate the compositions. The percentages by weight of the water of the respective examples were reflected by increasing the percent by weight of the respective water-insoluble organic liquid. The compositions obtained were tested according to the procedure outlined above against the compositions as obtained in Examples 1 through 3. The fiber or wood stock used of course was the same type. The comparative results established that although the effectiveness of the compositions containing no water was not as great as that obtained using the water containing compositions, the effectiveness was not significantly different. A visual comparison of the compositions however showed that the non-water containing compositions were not as smooth flowing due to some undissolved or undispersed ingredient. This fact was believed to have contributed to the slight loss of effectiveness.

EXAMPLES 15 THROUGH 17

Examples 1 through 3 were repeated with the exception that surfactants were used in the formulations. The composition of Example 15 contained 10% decyl alcohol; the composition of Example 16 contained 1% silicone oil (Union Carbide L-45), and the composition of Example 16 contained 5% of a polyether triol of high molecular weight (Union Carbide LHT-42). The differences in the percentage by weight resulting from the addition of the surfactants were reflected by a comparable lowering in the percent of the respective water-insoluble organic liquid.

The compositions of Examples 15 through 17 were comparatively tested with the compositions of Examples 1 through 3 according to the procedure outlined in preceding Examples 12 through 14. The compositions of Examples 15 through 17 proved to be slightly more effective than those of Examples 1 through 3. This conclusion was felt to be directly contributable to the spreading or dispersing effect of the surfactant. This conclusion was also borne out by a visual comparison of the respective compositions which showed the compositions containing the surfactant to appear more evenly mixed and smoother flowing.

EXAMPLES 18 THROUGH 20

As established by Examples 15 through 17 the inclusion of a surfactant did offer some advantage. However, these examples established this fact for compositions which contained water. In order to demonstrate that the effectiveness of compositions containing surfactants but in the absence of water, Examples 12 through 14 were repeated with the exception that surfactants were added. The composition of Example 18 contained 10% decyl alcohol, the composition of Example 19 contained 1% silicone oil (Union Carbide L-45) and the composition of Example 20 contained 5% polyether triol of high molecular weight (Union Carbide LHT-42). The differences in the percentage by weight resulting from the addition of the surfactants was reflected by a comparable lowering in the percent by weight of the respective water insoluble organic liquid.

The compositions of Examples 18 through 20 were comparatively tested against those compositions as derived in Examples 12 through 14. The testing established that the products of Examples 18 through 20 to be more effective. This improvement is believed to be due to the dispersive characteristics of the spreading agents added. In addition, a visual comparison of the compositions revealed that the compositions of Examples 18 through 20 flowed more smoothly.

Having thus described the invention, what we claim is:

1. A method of controlling foam in an aqueous system of a kraft pulp mill which comprises adding thereto an effective amount for the purpose of a product obtained by heating to a temperature of from about 160° to about 220° F. and for about 15 to 90 minutes, a composition consisting essentially of, on a weight basis:
   (i) from about 0.5% to about 20% finely divided aluminum oxide particles having an average particle diameter of less than 15 microns and prepared by the hydrolysis of aluminum chloride in a flame;
   (ii) from about 0.1% to about 10% of at least one hydroxide selected from the group consisting of alkali metal hydroxides and alkaline earth metal hydroxides;
   (iii) from about 0.1% to about 10% of a monocarboxylic fatty acid having from about 6 to about 24 carbon atoms; and
   (iv) from about 60 to about 98% of a water insoluble organic liquid selected from the group consisting of vegetable oils, aliphatic hydrocarbons, alicyclic hydrocarbons, halogenated aromatic hydrocarbons, long chain alcohols, long chain esters and long chain amines; said organic liquid having a boiling point of 150° F. or greater and is liquid at room temperature, and in the case of a hydrocarbon liquid carrier, a viscosity of 30 to 400 SUS at 100° F.

2. A method according to claim 1 wherein said composition contains from about 0.5% to 10% of a surfactant, selected from the group consisting of decyl alcohol, silicone oils and polyether polyols.

3. A method according to claim 1 wherein said composition contains water.

4. A method according to claim 3 wherein said composition contains from about 0.5% to about 10% of a surfactant, selected from the group consisting of decyl alcohol, silicone oils and polyether polyols.

5. A method according to claim 1 wherein said water-insoluble organic liquid is hydrophobic.

6. A method according to claim 5 wherein said composition contains water.

7. A method according to claim 1 wherein said metal hydroxide is calcium hydroxide, said fatty acid contains from about 16 to about 22 carbon atoms and said liquid hydrocarbon is a refined paraffinic hydrocarbon oil.

8. A method according to claim 7 wherein said composition contains from about 0.5% to about 10% surfactant, selected from the group consisting of silicone oils, polyether polyols and decyl alcohol.

9. A method according to claim 7 wherein said composition contains from about 0.1% to about 10% water.

10. A method according to claim 9 wherein said composition contains from about 0.5% to about 10% of a surfactant, selected from the group consisting of silicone oils, polyether polyols and decyl alcohol.

11. A method according to claim 10 wherein said fatty acid is a mixture of fatty acids composed primarily of palmitic and stearic acids.

12. A method according to claim 11 wherein said composition contains from about 0.5% to about 10% surfactant, selected from the group consisting of silicone oils, polyether polyols and decyl alcohol.

13. A method according to claim 12 wherein said composition contains from 0.1% to about 10% water.

14. A method according to claim 13 wherein said composition contains from about 0.5% to about 10% of a surfactant, selected from the group consisting of silicone oils, polyether polyols, and decyl alcohol.

References Cited

UNITED STATES PATENTS

| | | | |
|---|---|---|---|
| 2,753,309 | 7/1956 | Figdor | 252—321 |
| 2,797,198 | 6/1957 | Chappell | 252—321 |
| 1,957,513 | 5/1934 | Wolfson | 252—321 |
| 2,304,805 | 12/1942 | Denman | 252—321 |
| 3,235,509 | 2/1966 | Nitzsche | 252—358 |

JOHN D. WELSH, Primary Examiner

U.S. Cl. X.R.

252—358; 162—179